United States Patent
Larsson et al.

(10) Patent No.: US 12,408,034 B2
(45) Date of Patent: Sep. 2, 2025

(54) ACCESS CONTROL SYSTEM AND A METHOD THEREIN FOR HANDLING ACCESS TO AN ACCESS-RESTRICTED PHYSICAL RESOURCE

(71) Applicant: Axis AB, Lund (SE)

(72) Inventors: Ingemar Larsson, Lund (SE); Olle Blomgren, Lund (SE)

(73) Assignee: AXIS AB, Lund (SE)

( * ) Notice: Subject to any disclaimer, the term of this patent is extended or adjusted under 35 U.S.C. 154(b) by 253 days.

(21) Appl. No.: 17/940,123

(22) Filed: Sep. 8, 2022

(65) Prior Publication Data
US 2023/0072114 A1    Mar. 9, 2023

(30) Foreign Application Priority Data
Sep. 9, 2021   (EP) ..................... 21195681

(51) Int. Cl.
*H04W 12/06* (2021.01)
*H04W 12/08* (2021.01)

(52) U.S. Cl.
CPC ......... *H04W 12/068* (2021.01); *H04W 12/08* (2013.01)

(58) Field of Classification Search
CPC H04W 12/068; H04W 12/08; G07C 9/00309; G07C 2009/00873; G07C 2009/00888; G07C 9/00857; G07C 2209/04; G07C 2209/08; G07C 2209/14
See application file for complete search history.

(56) References Cited

U.S. PATENT DOCUMENTS

| | | | |
|---|---|---|---|
| 7,770,206 B2 | 8/2010 | Dillaway et al. | |
| 9,990,786 B1 | 6/2018 | Ziraknejad | |
| 12,020,525 B2 * | 6/2024 | Kwok | G07C 9/253 |
| 2007/0181673 A1 * | 8/2007 | Rietveld | G07C 9/257 235/382 |

(Continued)

FOREIGN PATENT DOCUMENTS

| | | |
|---|---|---|
| EP | 1325476 A1 | 7/2003 |
| EP | 1398737 A2 | 3/2004 |

(Continued)

OTHER PUBLICATIONS

Extended European Search Report dated Mar. 11, 2022 for European Patent Application No. 21195681.8.

*Primary Examiner* — Sonji N Johnson
(74) *Attorney, Agent, or Firm* — Volpe Koenig

(57) ABSTRACT

An access control system and a method performed therein, for handling access to an access-restricted physical resource. The method comprises, by means of a first credential reader, receiving an initiating access request credential initiating a request to give one or more visitors access to a first access-restricted physical resource. The method further comprises, by means of the first credential reader, receiving a visitor credential for each visitor for which access is requested, and, by means of a second credential reader, receiving a finalising access request credential finalising the request to give the one or more visitors access. Furthermore, the method comprises, by means of a first resource controller, allowing a visitor to access the first access-restricted physical resource upon presenting the visitor's visitor credential to the first credential reader.

19 Claims, 6 Drawing Sheets

(56) References Cited

U.S. PATENT DOCUMENTS

2013/0292467 A1* 11/2013 Avs ........................ G07C 9/22
                                                                               235/382
2019/0325682 A1* 10/2019 Petkov .................... G06T 7/521
2024/0141695 A1* 5/2024 Lessard .............. G07C 9/00309

FOREIGN PATENT DOCUMENTS

| EP | 3358534 A1 | 8/2018 | |
| WO | 02/31778 A1 | 4/2002 | |
| WO | WO-2014016695 A2 * | 1/2014 | ......... H04L 63/0492 |
| WO | 2017/136111 A1 | 8/2017 | |
| WO | 2021/050616 A1 | 3/2021 | |

* cited by examiner

ACCESS CONTROL SYSTEM AND A METHOD THEREIN FOR HANDLING ACCESS TO AN ACCESS-RESTRICTED PHYSICAL RESOURCE

FIELD OF INVENTION

The present disclosure relates to an access control system and a method therein for handling access to an access-restricted physical resource.

TECHNICAL BACKGROUND

Access control systems are widely used to provide access to access-restricted resources only to persons determined to be authorised to have access. The access-restricted resources may be a property, an office, or a certain space thereof, and the authorised person may be a property owner, an employee, or a visitor, just to give some examples. Usually, an administrator of the access-control system issues an access card to the authorised person. The access card may be configured with data granting the authorised person access to access-restricted physical resources according to a configuration made by the administrator. Alternatively, the access control system may be configured with the data granting the authorised person access and the access card may be uniquely associated with the data on the access control system. The configuration defines which access-restricted physical resources the person should be given access to and it may also define when an access should be allowed and/or how many times access should be allowed. Once in receipt of the access card, the authorised person presents his/her access card to a card reader at an access-restricted area he/she wants to enter. The card reader reads the data on the access card and the access control system determines whether the person is authorised to access the access-restricted area. If it is determined that the person is authorised to enter the access-restricted area, and if any possible limitations regarding when access is allowed and/or how many times access is allowed are met, access to enter will be granted. For example, upon a successful authentication and authorisation of the person, a locked door or gate preventing entrance to the access-restricted area will be unlocked allowing the authorised person to enter.

If any changes are to be made to the authorised person's rights to access the access-restricted physical resource, the administrator needs to perform those changes by reconfiguring the access card or the access-control system. Thus, if a host wants a visitor to have access to some desired access-restricted physical areas determined by the host and during some periods of times also determined by the host, he/she needs to ask the administrator to issue an access card and to configure the access-control system in order to give the visitor access to the desired access-restricted physical areas during the desired period of times. The host also needs to ask the administrator to perform any desired changes to a visitor's access rights.

U.S. Pat. No. 9,990,786 B1 discloses a system wherein a request is received by a member of a credential granting authority to issue an electronic visitor credential to a visitor of the credential granting authority. The electronic visitor credential enables access to resources of the credential granting authority. Based on a determination that the member of the credential granting authority is authorized to issue the credential to the visitor, the electronic visitor credential is issued with at least one timing restriction that defines a time period during which the electronic visitor credential is valid and at least one usage restriction that limits resources of the credential granting authority to which the electronic visitor credential enables access.

U.S. Pat. No. 7,770,206 B2 describes how a right to provide access to a resource of a first organization to a requestor of a second organization is delegated from a first administrator of the first organization to a second administration of the second organization.

EP 3 358 534 A1 describes a system for controlling access to a physical space within a building. An administrator's smartphone stores access rights readable by an electronic lock, and user rights for accessing an access control server and for delegating access rights. Upon receiving a request of delegation of access rights from the administrator's smartphone, the access control server defines access rights for another mobile phone, so that the electronic lock may be opened using the other mobile phone upon validating its access rights.

EP 1 325 476 A1 discloses a wireless lock and key system using an encryption key pair. When a lock senses a person nearby, the random signal is generated. The key encrypts the signal and returns it to the lock. The lock decrypts the signal and compares it to the original to determine if the lock should be opened. The key may generate temporary tickets for guests to open the lock for limited times.

EP 1 398 737 A2 discloses a method and a system for uniquely identifying an entity. The system includes a wireless identification device with a controller mechanism for wirelessly communicating and acquiring, processing and transmitting data. A reader device having a controller mechanism acquires, processes and transmits data and a sensing mechanism is in communication with the reader device for acquiring, processing and transmitting data from the wireless identification device. A wireless control device is included for communicating with the reader device and can communicate with and configure the reader device, the wireless identification device or subsequent wireless identification devices.

WO 2021/050616 A1 discloses an entry system for a building having: a first door lock that includes a controller; wherein the first door lock is configured for encoding access rights to a first client key card responsive to a first engagement with a master key card.

Some prior art procedures requiring involvement of an administrator to issue access cards and to set up and change access rights may be experienced as cumbersome for the host since he/she is not able to give or change access rights without involving the administrator.

Even if systems exist wherein the administrator can delegate the right to give access, there is room for improvements in order to obtain a simplified handling of access to an access-restricted physical resource.

SUMMARY

In view of the above, mitigating drawbacks with the prior art and to providing an access-control system and a method therein that simplifies handling of access to an access-restricted physical resource.

According to a first aspect, a method for handling access to an access-restricted physical resource comprises, by a first credential reader associated with a first access-restricted physical resource, receiving an initiating access request credential initiating an access request to give one or more visitors access to the first access-restricted physical resource. The first credential reader is arranged in communication with a first resource controller controlling access to the first access-restricted physical resource. Further, the method comprises, by the first credential reader, receiving a visitor credential for each visitor for which access is requested and informing the first resource controller about each received visitor credential, and by a second credential reader arranged in communication with the first resource controller, receiving a finalising access request credential finalising the access request to give the one or more visitors access to the first access-restricted physical resource. Furthermore, the method comprises, by the first resource controller, allowing a visitor to access the first access-restricted physical resource upon presenting the visitor's visitor credential to the first credential reader.

By receiving firstly, the initiating access request credential, secondly visitor credentials for all visitors for which access is requested, and thirdly, the finalising access request credential at a credential reader, e.g., the first credential reader or the second credential reader, in communication with the resource controller controlling access to the first access-restricted physical resource, the procedure of requesting and giving access rights to a number of visitors is simplified. For example, a host may present the initiating access request credential to the credential reader, whereby the credential reader receives the initiating access request credential by reading it. Upon reception of the initiating access request credential, the access control system, e.g., a resource controller or an access controller, is made aware that a request to add rights for access is initiated, and that the rights to access the first access-restricted physical resource should be given to visitors having the one or more visitor credentials that are received after the initiating access request credential. The reception of the finalising access request credential finalises the access request. Thereafter, the visitors will be given access to the first access-restricted physical resource when presenting their visitor credential to the first credential reader.

By the expression "handling access to an access-restricted physical resource" when used herein is meant handling of rights to access the access-restricted physical resource. It could also be expressed as managing access or managing rights to access. For example, it could be adding rights to access the access-restricted physical resource to an authorised person, changing rights to access for the authorised person, updating rights to access in response to performed accesses by the authorised person, and removing access rights when an authorised person should not be allowed to have access anymore.

By the expression "access-restricted physical resource" when used in this disclosure is meant a resource that is tangible, i.e., concrete, and to which access is restricted. For example, the access-restricted physical resource may be an access-restricted area such as a building, a room, an office, an outdoor environment, or an access-restricted equipment, such as a charging station for charging of electric vehicles or a computerized equipment. Access to the physical resource may be restricted so that only authorised persons are permitted to access the access-restricted area. For example, an authorised person may be allowed to enter the physical resource a certain number of times, during certain times of the day and/or between certain dates. Further, access to the physical resource may be restricted in that usage of the access-restricted equipment is only permitted to authorised persons. The latter may be the case when an authorised person is allowed to access the charging station to charge his/her electric car.

The term "access" when used herein may refer to consuming, entering, and/or using an access-restricted physical resource. Thus, the act of accessing may mean consuming, entering, or using the resource. Permission to access a resource is called authorisation, and an authorised person is a person permitted to access the access-restricted physical resource.

By the term "credential" when used herein is meant anything that can be used to authenticate a person. A credential may be something the person has, something the person knows, or something about the person that is unique. Something the person has may be an access card, something the person knows may be a keypad code, and something about the person that is unique may be the person's fingerprint, just to give some examples. The credential may be a device such as a smart card that comprises data, herein also referred to as credential, to be received by a credential reader and used to authenticate the person, but as mentioned above the credential may also be the data, e.g., the keypad code given to a keypad. Thus, the credential may be in the form of a smart card such as an access card; a key fob; a user ID, a secret password; an authenticating code, e.g., a Quick Response (QR) code, presented on a mobile device such as a smartphone or smartwatch; a Near-Field Communication (NFC) device acting as an electronic identity document and key card; biometric data such as fingerprints, face recognition, voice recognition, and/or retinal scans; or a public key certificate such as an X.509 certificate. It should be understood that the term "credential" also may refer to a combination of two or more of the above-mentioned examples.

The "initiating access request credential" is a credential that initiates an access request, such as a request to add access to a new visitor.

The "finalising access request credential" is a credential that finalises the access request, such as the request to add access to the new visitor.

The "visitor credential" is a credential associated with the visitor to which access is requested.

By the term "credential reader" when used in this disclosure is meant a device capable of receiving a credential. For example, the credential reader may receive the credential by being configured to receive, read or scan the credential when the credential is given to the credential reader or when the credential is presented to the credential reader. The credential does not need to be physically in contact with the credential reader but the credential may be presented at a distance from the credential reader. However, depending on the technology used to read or scan the credential, the credential may need to be in close proximity to the credential reader. The credential reader may be a card reader such as a magnetic card reader, an NFC reader, a keypad, or a biometric reader, such as a fingerprint reader or a face scanner. The device may also be an imaging device capable of capturing an image of the credential. Thus, the credential reader is a device by which the credential is inputted into the access control system. Further, the credential reader may be a device configured to read, e.g., by means of ultrawideband technology, a first credential carried by a mobile device such as a smartwatch. Such a credential reader may also be configured to read a second credential being biometric data from the mobile device. Such biometric data may be heartbeat data that could be used to authenticate a host or a visitor. The first and second credentials may be used in multifactor authentication of the host or a visitor.

By the term "resource controller" when used herein is meant a device configured to control access to the access-restricted physical resource. The resource controller is arranged in communication with the credential reader. Further, the resource controller may comprise or may be in communication with a locking means configured to unlock access to an access-restricted physical resource to permit an authorised person access and configured to lock access to the access-restricted physical resource to prevent an unauthorised person from accessing the access-restricted physical resource. For example, when the access-restricted physical resource is a building or a room, the resource controller may be a door station comprising the credential reader, and the locking means may be a door lock.

By the term "visitor" when used in this disclosure is meant any person that may request access to the access-restricted physical resource. Thus, the visitor, may be a consumer, a person who wants to enter, or a person who wants to use the access-restricted physical resource. Throughout this disclosure the term visitor will be used, but it should be understood that other terms such as consumer, requester, accessor, or user would be equally applicable.

According to a second aspect of the disclosure, an access control system for handling access to an access-restricted physical resource comprises a first credential reader associated with a first access-restricted physical resource and being arranged in communication with a first resource controller controlling access to the first access-restricted physical resource. The first credential reader is configured to receive an initiating access request credential initiating an access request to give one or more visitors access to the first access-restricted physical resource, configured to inform the first resource controller about each received visitor credential, and configured to receive a visitor credential for each visitor for which access is requested. Further, the access control system comprises a second credential reader arranged in communication with the first resource controller and configured to receive a finalising access request credential finalising the access request to give the one or more visitors access to the first access-restricted physical resource. The first resource controller is configured to allow a visitor to access the first access-restricted physical resource upon presenting the visitor's visitor credential to the first credential reader.

A third aspect of the disclosure is achieved by a non-transitory computer-readable medium having stored thereon computer code instructions adapted to carry out the method of the first aspect when executed by a device having processing capability.

The second and third aspects may generally have the same features and advantages as the first aspect. Embodiments of the disclosure are defined in the appended depending claims. It is further noted that the disclosure relates to all possible combinations of features disclosed herein unless explicitly stated otherwise.

BRIEF DESCRIPTION OF THE DRAWINGS

The above, as well as additional objects, features and advantages of the present disclosure, will be better understood through the following illustrative and non-limiting detailed description of embodiments of the present disclosure, with reference to the appended drawings, where the same reference numerals will be used for similar elements, wherein.

DETAILED DESCRIPTION

Figure 1:
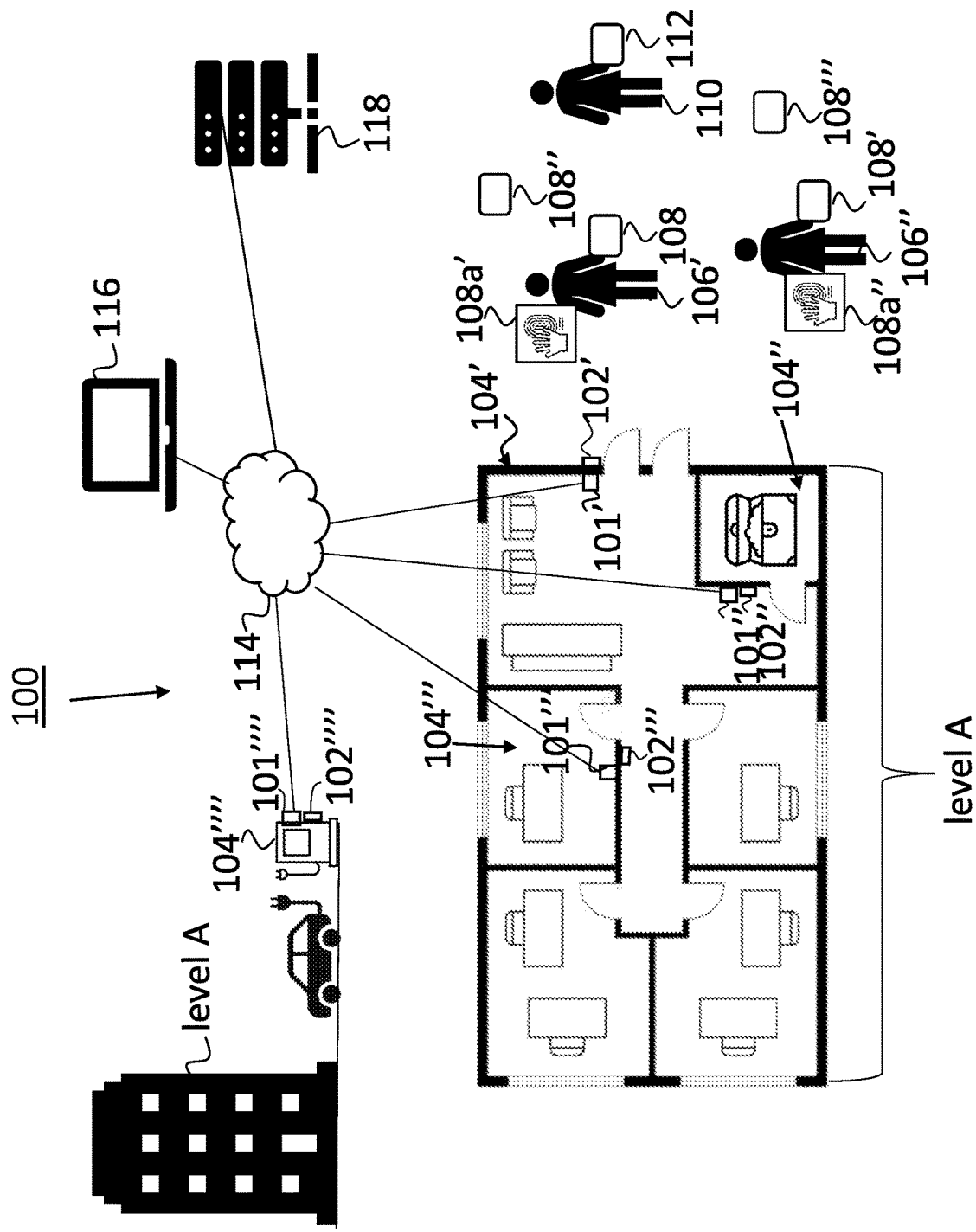
FIG. 1 schematically illustrates an access control system according to embodiments.

Before going into a detailed description of embodiments of the present disclosure, a brief and exemplifying description will now be given in order to give a general understanding of the disclosure.

It is generally an advantage of an access control system if a host could easily and dynamically add access rights to new visitors and to change given access rights. According to embodiments disclosed herein, a host may give a visitor access to a specific set of resources for a specific period of time or for a specific date. The set of resources available to a visitor may be extended and reduced dynamically. This gives a host a flexible way of automatically configuring access control to a visitor without knowing anything about how to configure the access control system as such. For example, the host holds a credential that gives him/her a right to dynamically grant access to another credential held by a visitor. In order to grant a visitor access to a specific resource, the host may initially present, e.g., swipe, his/her credential to a credential reader arranged at the specific access-restricted physical resource. This may be seen as initiating a request to give access. The host's credential may have been configured with instructions informing the card reader that all credentials, e.g., all visitors' credentials, being presented to the card reader after the presentation of the host's credential are to be given access to the specific access-restricted physical resource. Alternatively, the access control system may be configured to give access to all credentials presented to the credential reader after the presenting of the host's credential. The access may be valid for a certain period of time or for a certain number of accesses. The visitor credentials received by the credential reader may be added to a queue for addition to the access control system. When all visitor credentials have been presented, e.g., swiped, the host finalises the request to give access by presenting, e.g., swiping, the same or another credential to the same credential reader or to another credential reader comprised in the access control system. The access control system recognises this final credential and adds the visitors' credentials to credentials that are allowed to give access to the access-restricted physical resource.

When the visitor wants to access the specific access-restricted physical resource, he/she presents his/her credential to the credential reader arranged at the specific resource and access to the specific access-restricted physical resource is given.

As the host shows the visitors around in for example a building, he/she may, by the method described above, give the visitors access to more access-restricted physical resources within the building as they reach them during their tour through the building. Thereafter, the visitors are able to access the access-restricted physical resources without being accompanied by the host. If the host realises that he/she has forgotten to give a visitor access to a certain access-restricted physical resource, he/she can just go back to the credential reader at the access-restricted physical resource and repeat the procedure with the visitor's credential to add access to the visitor.

A visitor may have an access right to an access-restricted physical resource changed or removed by the same or a similar procedure. For example, the host presents his/her credential, possibly another credential, to the credential reader at the access-restricted physical resource, then the host presents the visitor credential to be removed from having access to the access-restricted physical resource, and finally the host presents his/her credential, possibly another credential. Since the visitor credential is already known to the access control system, the access control system realises that a change of the visitor's access is to be made. Preferably, one of the host credentials is accompanied with information relating to the desired change to be made. In response to receiving the information, the access control system executes the requested change. If the information is to remove a visitor from having access, the visitor's visitor credential is removed from having access and if the visitor presents the visitor credential to the credential reader, access to the access-restricted physical resource will be denied. If the information relates to a change in the period of time during which access should be allowed to the visitor, the information relating to the visitor is updated with the new period of time, and the visitor is only allowed to access the access-restricted physical resource during the new period of time.

Since the host, at a credential reader, is able to add rights to access and/or to change rights to access an access-restricted physical resource, the handling of access rights is simplified.

The present disclosure will now be described more fully hereinafter with reference to the accompanying drawings, in which embodiments of the disclosure are shown.

FIG. 1 schematically illustrates an exemplary embodiment of an access control system 100. The exemplary access control system 100 comprises one or more resource controllers 101 and one or more credential readers 102. In the illustrated example, the one or more credential readers 102 are associated with a respective access-restricted physical resource 104 and are arranged in communication with a respective resource controller 101 configured to control access to a respective one of the access-restricted physical resources 104. In this disclosure the access-restricted physical resource 104 may be referred to as "access-restricted resource" or just "resource".

The one or more resource controllers 101 are in general referred to using the reference number 101. The same is true when referring to only one of them if it is not important to point out a specific one. If a differentiation between a first, a second, a third and a fourth resource controller is to be made, the reference number followed by one, two, three or four primes ('), respectively, will be used. Thus, the reference number used for a first resource controller is 101' and for a fourth resource controller it is 101''''. The same is true for other reference numbers used herein.

The resource controller 101 and the respective credential reader 102 may be located in close proximity to each other, even comprised within a single device, but they may also be located at a distance from each other as long as they are arranged in communication with each other.

In FIG. 1, a first credential reader 102' is associated with a first access-restricted physical resource 104' being in the illustrated example a floor level A of a building. As illustrated, the first credential reader 102' is arranged at the outside entrance of an office at floor level A. A second credential reader 102'' is associated with a second access-restricted physical resource 104'' exemplified as being a secret archive, and a third credential reader 102''' is associated with a third access-restricted physical area 104''' exemplified as being an office space.

In the illustrated example, the first, second and third resource controllers 101',101'',101''' are arranged at the respective first, second and third access-restricted physical resources 104',104'',104''' and in communication with a respective one of the first, second and third credential readers 102',102'',102'''. The first, second and third resource controllers 101',101'',101''' are configured to control access of the respective first, second and third access-restricted physical resources 104',104'',104''' based on credentials received at a respective one of the first, second and third credential readers 102',102'',102'''. However, it should be understood that it does not have to be a one-to-one relation between the resource controllers, credential readers, and the access-restricted physical resources. For example, one of the resource controllers may be connected to a plurality of credential readers, and some credential readers out of the plurality of credential readers may be associated with one and the same access-restricted physical resource.

The one or more credential readers 102 are configured to read credentials and to transmit each read credential to a respective associated resource controller 101. The resource controller 101 may initiate a comparison between a received credential with credentials comprised in a set of allowed credentials associated with the access-restricted physical resource 104. The comparison may be performed by the resource controller 101 or by an access controller, e.g., an access controller 118 as will be described below, communicatively connected to the resource controller 101. If a match is detected, the resource controller 101 permits access to the access-restricted physical resource 104 to the visitor associated with the read credential. Permission to enter a room may for example be given by unlocking a looked door. If no matching credential is detected, the resource controller 101 prevents the visitor associated with the read credential from accessing the access-restricted physical resource 104 by for example letting a locked door stay locked.

In some embodiments, the credential reader 102 is configured to convert a read credential into a Wiegand ID and to transmit the Wiegand ID to the associated resource controller 101. In such embodiments, the set of allowed credentials associated with the access-restricted physical resource 104 comprises Wiegand IDs and the resource controller 101 or the access controller 118 compares a received Wiegand ID with the Wiegand IDs comprised in the set of allowed credentials. If a match is detected the visitor is given access to the access-restricted physical resource 104, while she/he is prevented from accessing the access-restricted physical resource 104 in case a match could not be found.

As previously mentioned, the one or more access-restricted physical resources 104 may each be an access-restricted area such as a building, a room, an office, an outdoor environment, or each may be an access-restricted equipment, such as a charging station for electric vehicles or a computerized equipment, depending on the access control situation at hand. As schematically illustrated in FIG. 1, the exemplified access control system 100 also comprises a fourth access-restricted physical resource 104'''' being a charging station for electric vehicles. In the illustrated example, the charging station is provided with a fourth resource controller 101'''' and a fourth credential reader 102''''.

FIG. 1 also schematically illustrates two hosts 106, e.g., a first host 106', and a second host 106", and a visitor 110. It should be understood that the number of hosts is only given as an example and that the number of hosts could be only one host or more than two hosts. The one or more hosts 106 is a host for a number of visitors 110 for which access to an access-restricted physical resource 104 is to be given. Any person authorised to give a visitor access to the access-restricted physical resource 104 can be a host. Thus, by the term "host" when used in this disclosure is meant any person authorised to give a visitor access to an access-restricted physical resource. For example, if the access-restricted physical resource is an office, the host may be an office employee authorised to give visitors access to the office or to spaces within the office. As another example, in case the access-restricted physical resource is a charging station for electric cars, the host may be an attendant of the charging station who is authorised to give a visitor, e.g., a driver of an electric vehicle, access to the charging station so she/he is able to charge the electric vehicle.

When one or more visitors 110 is to be given access to an access restricted physical resource 104, an initiating access request credential 108 is received by the first credential reader 102' associated with the first access-restricted physical resource 104'. The initiating access request credential 108 is presented to the first credential reader 102' by a host 106, e.g., the first host 106' or the second host 106". The reception of the initiating access request credential 108 initiates a request to give one or more visitors 110 access to the first access-restricted physical resource 104. Thereafter, the first credential reader 102 receives a visitor credential 112 for each visitor for which access is requested. This means that for each of the visitors to be given access, each visitor's credential has to be presented to the first credential reader 102'. When all visitor credentials 112 have been presented, the request to give the visitors access is finalised by inputting a finalising access request credential 108' to the access control system 100. The finalising access request credential 108' is received by a second credential reader 102" arranged in communication with the first resource controller 101'. The finalising access request credential 108' is presented to the second credential reader 102 by a host 106, e.g., the first host 106' or the second host 106". In some scenarios wherein a group of visitors have two hosts, one of the hosts 106, e.g., the first host 106', may present the initiating access request credential 108 to the first credential reader 102', and the other host, e.g., the second host 106", may present the finalising access request credential 108' to the second credential reader 102".

After the request to give access have been finalised, the first resource controller 101' is configured to allow a visitor 110 to access the first access-restricted physical resource 104' upon presenting the visitor's 110 visitor credential 112 to the first credential reader 102'.

It should be understood that the second credential reader 102" may be the same credential reader as the first credential reader 102'. Thus, the first and second credential readers 102', 102" may be a single credential reader. This may be the case when the host 106 initiates and finalises the request to add access at a single credential reader. For example, the host 106 and the visitors 110 may walk through a building comprising a plurality of access-restricted physical resources 104. When they arrive at an access-restricted physical resource 104 to which the visitors 110 are to be given right to access, the host 106 presents the initiating access request credential 108 to the credential reader 102 at the access-restricted physical resource 104. Thereafter, the host presents the visitor credentials 112 of all visitors to be given access to the same credential reader 102 followed by the finalising access request credential 108'. Then the received visitors' credentials will be added to a set of allowed credentials associated with the access-restricted physical resource 104. If a visitor later presents his/her visitor credential 112 to the credential reader 102, the visitor will be allowed to access the access-restricted physical resource 104. After access has been given to one access-restricted physical resource 104, the host 106 and the visitor 110 may continue their walking tour through the building and rights to access other access-restricted physical resource 104 may be given in the same manner.

Alternatively, the first and second credential readers 102, 102' may be two different credential readers associated with the first access-restricted physical resource 104' and both of which are arranged in communication with the first resource controller 101'. This may be the case when for example the first access-restricted physical resource 104' is a room having two entrance doors. In such case, the first credential reader 102' may be arranged at a first door and the second credential reader 102" may be arranged at a second door. The host 106 may present the initiating access request credential 108 and the one or more visitor credentials 112 to the first credential reader 102' at the first door and then walk through the room to the second door. At the second door, the host presents the finalising access request credential 108' to the second credential reader 102". Thereby, the request to give the one or more visitor credentials 112 access to the room is finalised and the visitor credentials will be added to a set of allowed credentials for the room. This set of allowed credentials is preferably accessible at both the first and second credential readers 102',102" so the visitor 110 is able to enter the room through either one of the doors after having presented his/her visitor credential to the credential reader 102',102' at the door.

In FIG. 1 it is also schematically illustrated how the one or more resource controllers 101 are communicatively connected over a network 114 to a client 116 and/or an access controller 118, which may be connected to the network 114. The client 116 and/or access controller 118 may be arranged on-premises, i.e., at the same geographical location as the one or more access-restricted physical resources 104 or may be arranged geographically remote from the one or more access-restricted physical resources 104, i.e., at a geographical location that is located a distance away from the one or more access-restricted physical resources' 104 geographical location(-s). Further, the client 116 and the access controller 118 may be arranged at different geographical locations. It should be understood that there are many combinations of wireless and wired communication models that can be used for communication between the resource controllers 101 and the network 114, and between the network 114 and the client 116 and/or the access controller 118, and that FIG. 1 only illustrates one example.

The client 116 may have a display where an operator, e.g., the administrator, can view information relating to for example visitors and hosts, a given visitor's access rights, information relating to access-restricted physical resource(s) a certain visitor has accessed. It may also be possible for the operator to view the host that has given the visitor access. Typically, the client 116 is also connected to the access controller 118, where the given access rights may be stored and/or processed further. The client 116 may be used to control the operation of the resource controllers 101, for example, by the operator issuing control commands at the client 116. Further, the client 116 may be used by an operator to add access rights, remove access rights and to change access rights. The operator may also use the client 116 to group credential readers that are associated with access-restricted physical resources a visitor should have the same rights to access.

The access controller 118 may be a server configured to store and manage sets of approved credentials issued to individuals. Such sets are herein also referred to as sets of allowed credentials. In some access control systems, the access controller is referred to as an access control server. In some embodiments, the access controller 118 is implemented as a management software module (MSM) configured to store and manage the sets of approved credentials issued to individuals.

The client 116 and/or the access controller 118 may also configured to communicate with the one or more resource controllers 101 directly or indirectly over the network 114.

The access control system 100 may be arranged in different ways. The network topology of the access control system 100 may for example be centralised, de-centralised or distributed.

Figure 2:
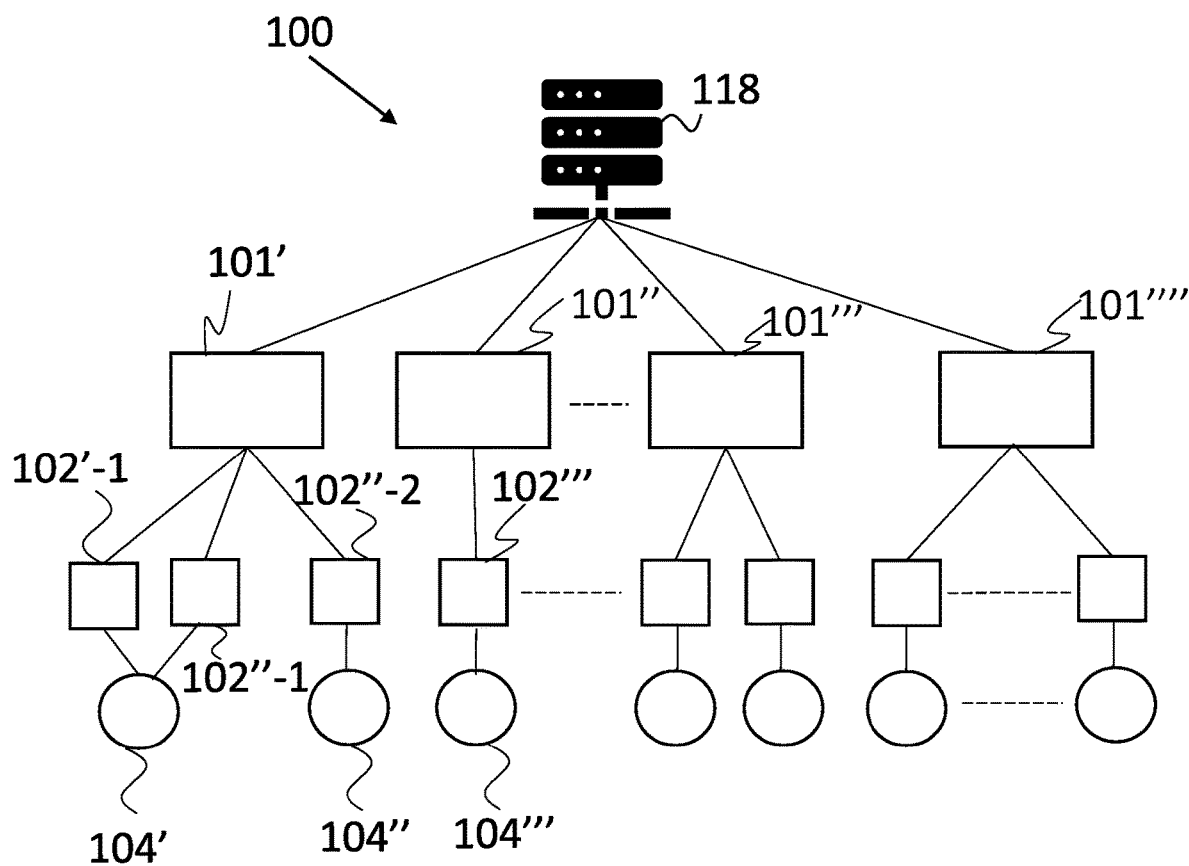
FIG. 2 schematically illustrates embodiments of an access control system as a centralised system comprising an access controller.

FIG. 2 schematically illustrates exemplifying embodiments of the access control system 100 being a centralised system comprising an access controller 118. As shown the access controller 118 is arranged centrally in the access control system 100, and a plurality of resource controller 101, e.g., a first, second, third and fourth resource controller 101',101",101'",101"", are arranged in communication with the access controller 118. The one or more resource controllers 101 are arranged in communication with one or more credential readers 102 and are configured to control access to one or more access-restricted physical resources 104.

Figure 3:
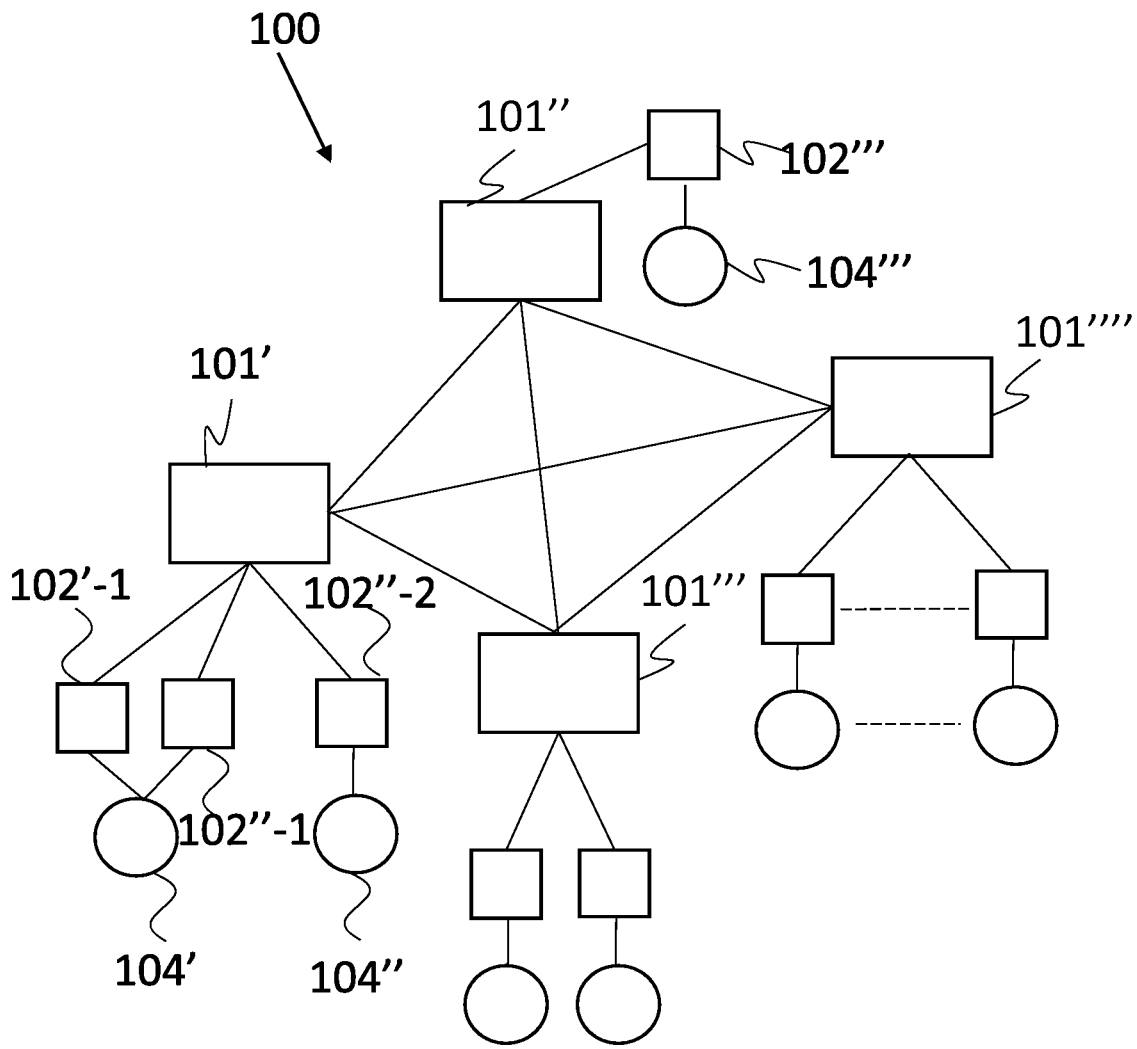
FIG. 3 schematically illustrates embodiments of an access control system as a distributed system without an access controller.

FIG. 3 schematically illustrates exemplifying embodiments of the access control system 100 as a distributed system without an access controller 118. In the illustrated example, all resource controllers 101 are communicatively connected to each other. It should be understood that the access control system 100 may be a decentralised system (not shown) without an access controller 118. When being a decentralised system, one of the resource controllers may be a master resource controller to which all other resource controllers are communicatively connected. In such case, the other resource controllers may be referred to as slave resource controllers.

In the examples illustrated in FIGS. 2 and 3, the resource controllers 101 are illustrated as rectangles, the credential readers 102 as squares and the access-restricted physical resources 104 as spheres.

Further, in FIGS. 2 and 3, the first resource controller 101' is arranged in communication with a first credential reader 102' and two second credential readers 102", e.g., a first second credential reader 102"-1 and a second second credential reader 102"-2. The first credential reader 102' and the first second credential reader 102"-1 are both associated with the first access-restricted physical resource 104' while the second second credential reader 102"-2 is associated with the second access-restricted physical resource 104". Thus, it should be understood that two different credential readers may be associated with one and the same access-restricted physical resource. For example, this may be the case when a single building has two entrances and a respective credential reader associated with the building is located at the respective entrance. It should be understood that one resource controller may control access to several access-restricted physical resources.

Furthermore, one or more other resource controllers, e.g., a second resource controller 101", a third resource controller 101'" and a fourth resource controller 101"" are arranged in communication with one or more other credential readers being associated with one or more other access-restricted physical resources. For example, the second resource controller 101" may be arranged in communication with one or more third credential readers 102'" being associated with one or more third access-restricted physical resources 104'".

Figure 4A:
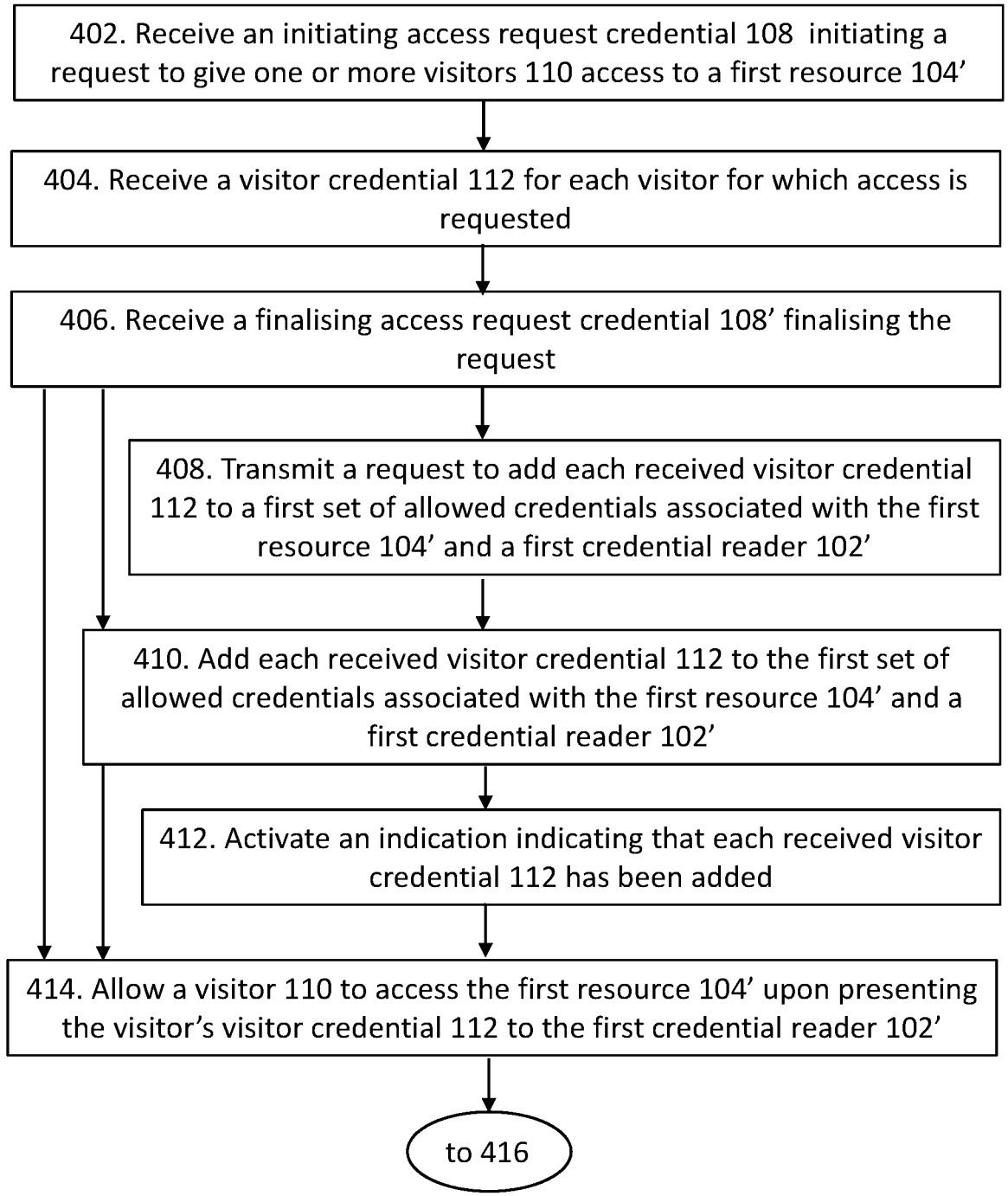
FIGS. 4A and 4B are a flowchart of a method for handling access to an access-restricted physical resource according to embodiments.
Figure 4B:
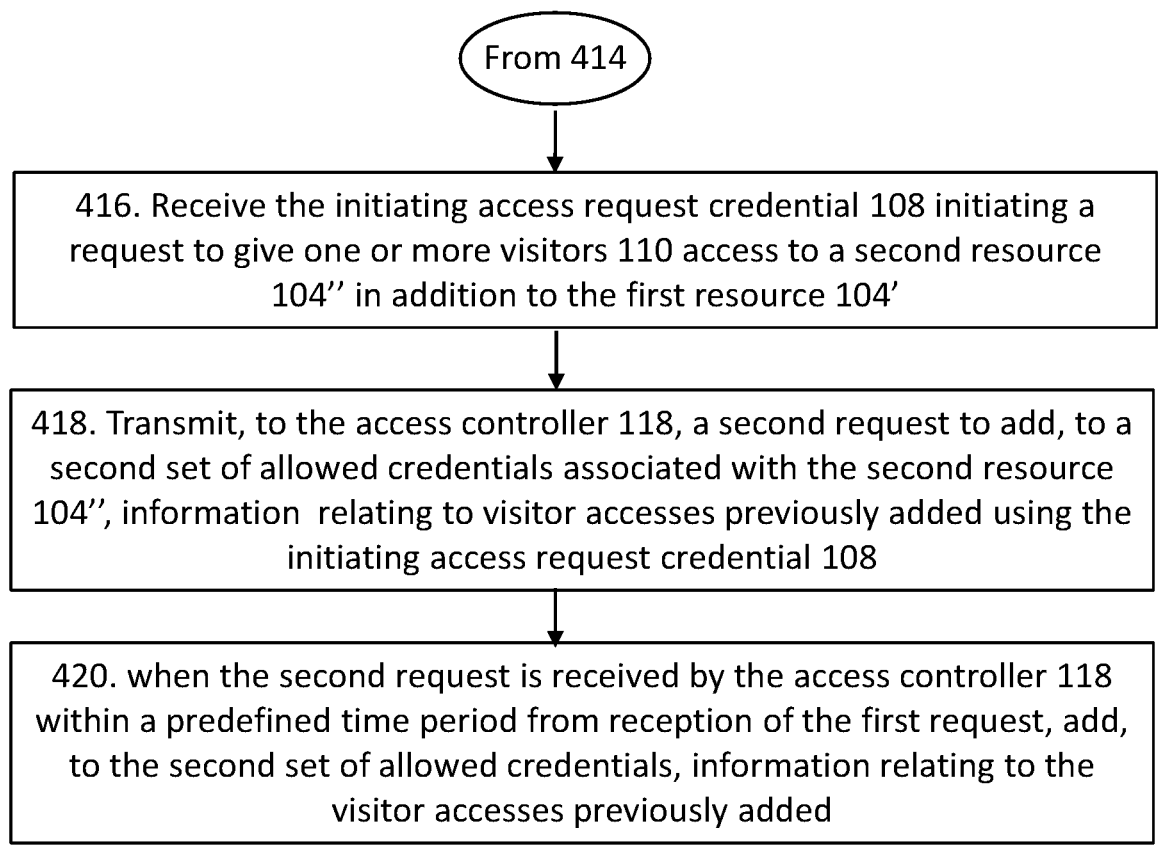

A method, performed in the access control system 100, for handling access to an access-restricted physical resource, will now be described with reference to the flowchart of FIGS. 4A and 4B. It should be understood that the method illustrated in FIGS. 4A and 4B may be performed by different parts of the access control system 100, that some of the actions may be optional and that actions may be taken in another suitable order.

In action 402, a first credential reader 102' associated with a first access-restricted physical resource 104' receives an initiating access request credential 108 initiating a request to give one or more visitors access to the first access-restricted physical resource 104'. The first credential reader 102' is arranged in communication with a first resource controller 101', controlling access to the first access-restricted physical resource 104'. As previously described, a host 106, e.g., the first host 106', or the second host 106", presents the initiating access request credential 108 to the first credential reader 102', whereby the first credential reader 102' receives the initiating access request credential by for example reading or scanning it. This initiates the request to give one or more visitors access to the first access-restricted physical resource 104'. The first credential reader 102' may inform the first resource controller 101' about the initiation of the request to give access.

In action 404, the first credential reader 102' receives a visitor credential 112 for each visitor for which access is requested. As also previously described, a host 106, e.g., the first host 106' or the second host 106", presents each visitor's visitor credential 112 to the first credential reader 102', whereby the first credential reader 102' receives each visitor credential by for example reading or scanning it. Thus, by presenting the visitor credentials 112 in a sequence, e.g., one by one, to the first credential reader 102' a plurality of visitor credentials 112 to be given the same access to the first access-restricted physical resource 104' can be inputted into the access control system 100 in a simple and efficient way.

In action 406, a second credential reader 102" arranged in communication with the first resource controller 101' receives a finalising access request credential 108' finalising the request to give the one or more visitors 110 access to the first access-restricted physical resource 104'.

As also previously described, a host 106, e.g., the first host 106' or the second host 106", presents the finalising access request credential 108' to the second credential reader 102", whereby the second credential reader 102" receives the finalising access request credential 108' by for example reading or scanning it. This finalises the request to give one or more visitors access to the first access-restricted physical resource 104'. The first credential reader 102', being comprised in or connected to the first resource controller 101', may inform the first resource controller 101' about the finalisation of the request to give access and of the one or more visitor credentials 112 received. Thereby, the first resource controller 101 will have knowledge about the visitor credentials 112 and can give access to the first access-restricted physical resource 104' when one of the visitor credentials 112 is presented to the first credential reader 102'.

Thanks to the procedure of presenting the credentials to a credential reader as described above, the initiation of a request to give one or more visitors access to a resource, the conveying of the visitor credentials to be used by the visitors when requesting access to the resource, as well as, the finalisation of the request is simplified.

As will be described below, the first credential reader 102' and the second credential reader 102" may be one out of: one and the same credential reader; and two different credential readers.

Thus, the first and second credential readers 102',102" may be a single credential reader 102 configured to receive both the initiating access request credential 108 and the finalising access request credential 108'.

Alternatively, the first and second credential readers 102', 102" are different credential readers arranged in communication with the first resource controller 101'. The different first and second credential readers 102',102" may be configured to receive both the initiating access request credential 108 and the finalising access request credential 108', but in an access request scenario one of them is receiving the initiating access request credential 108 and the other one of them is receiving the finalising access request credential 108'. The different first and second credential readers 102', 102" may be arranged at two different locations at the first access-restricted physical resource 104'. This may be the case when the first access-restricted physical resource 104' has two points where access to the first access-restricted physical resource 104' is possible. For example, the two points may be two doors into an access-restricted area. Alternatively, the first credential reader 102' is arranged at the first access-restricted physical resource 104' and the second credential reader 102" is arranged at a second access-restricted physical resource 104" controlled by the first resource controller 101'. This may be the case when the first access-restricted physical resource 104' is an access-restricted passageway leading to the second credential reader 102" at the second access-restricted physical resource 104".

When initiating and finalising the request to give access, the same credential or two different credentials may be presented to and received by the credential reader. Thus, the initiating access request credential 108 and the finalising access request credential 108' may be one out of a single access credential being associated with a first host 106' or a second host 106"; and two different access credentials, each of which being associated with only one out of the first host 106' and the second host 106". The first host 106' and the second host 106" are authorised to give the one or more visitors 110 access to the first access-restricted physical resource 104'.

The access request credentials, i.e., the initiating access request credential 108 and the finalising access request credential 108', are associated with a host, e.g., the first host 106' or the second host 106", in such a way that they are uniquely associated with the host in order to be able to authenticate the host.

Further, the initiating access request credential 108 or the finalising access request credential 108' may be received with an indication of a total amount of allowed access to the first access-restricted physical resource 104' that the one or more visitors 110 is to be given.

The indication of the total amount of allowed access may be given as a separate entry given to the credential reader after the initiating or finalising access request credential is received. For example, after presenting the initiating or finalising access request credential, the host may enter a character string such as:

*123*1400# by which the visitor is allowed access to a resource until 14:00 the same day,

*124*10# by which the visitor is allowed access to a resource for 10 days during office hours, and

*125*03/12# by which the visitor is allowed access to a resource until December 3, just to give some examples of character strings.

Character strings may be entered into credential readers having some kind of keyboard or keypad.

Alternatively, the indication of the total amount of allowed access may be comprised in the received initiating or finalising access request credential 108,108'. Every time such a credential is received at the credential reader 102, the credential reader 102 also receives the predefined total amount of allowed access. The host may have an initiating or finalising access request credential 108,108' that is predefined or preconfigured to give a certain total amount of access to a certain access-restricted physical resource. For example, the host's initiating or finalising access request credential 108,108' may be preconfigured to give a visitor access to a hotel room a certain number of days and to give the visitor access to the spa section two hours each day. Further, the initiating or finalising access request credential 108,108' may be presented several times to the credential reader 102 in order to increase the total amount of access by a multiple corresponding to the number of times the initiating or finalising access request credential 108,108' is presented. Thus, if the initiating or finalising access request credential 108,108' is preconfigured to give access one day, the host can present the initiating or finalising access request credential 108,108' five times to give the visitor a total amount of access of five days.

The total amount of allowed access may be given as one or more periods of time specifying certain times of the day and/or between certain dates the access should be allowed. Alternatively, or additionally, the total amount of allowed access may comprise an amount of usage or a number of times access should be allowed. Of course, the total amount of allowed access depends on the access-restricted physical resource to be accessed so other amounts than those mentioned above may be possible.

Multifactor Authentication

In some embodiments, multifactor authentication is performed, such as multifactor authentication of the host, e.g., the first host 106' or the second host 106". The term Multifactor authentication (MFA) encompasses two-factor authentication (2FA) and other multifactor authentication techniques. MFA is an electronic authentication method in which a user is granted access to an access-restricted physical resource only after successfully presenting two or more pieces of evidence (also referred to as factors) to an authentication mechanism. The pieces of evidence are herein referred to as credentials and may be knowledge, e.g., something only the user knows, possession, e.g., something only the user has, and inherence, e.g., something only the user is.

In embodiments comprising multifactor authentication, the first credential reader 102' or the second credential reader 102", receives at least one first host credential 108a' associated with the first host 106' or at least one second host credential 108a" associated with the second host 106".

Then the first resource controller 101' or the access controller 118 authenticates the first host 106' based on the at least one first host credential 108a' in combination with at least one of the initiating access request credential 108 and the finalising access request credential 108'.

Alternatively, the first resource controller 101' or the access controller 118 authenticates the second host 106" based on the at least one second host credential 108a" in combination with at least one of the initiating access request credential 108 and the finalising access request credential 108'.

For example, the at least one first host credential 108a' may comprise one or more credentials configured to authenticate the first host 106', and the at least one second host credential 108a" may comprise one or more credentials configured to authenticate the second host 106".

In embodiments comprising multifactor authentication, a host 106 is only allowed to add or change access rights to visitors when the host have been successfully authenticated using at least two different credentials. If the host cannot be authenticated, the one or more visitor credentials 112 presented to the first credential reader 101' will not be given access. By the use of several credentials in the authentication process the confidence in that the person presenting the credentials really is the host is increased as compared to when only one credential is used to authenticate the host 106.

Adding Visitor Credentials at the Access Controller 118

In some embodiments, a request to add each received visitor credential 112 to a first set of allowed credentials is transmitted to the access controller 118 comprised in the access control system 100. The first set of allowed credentials is associated with the first access-restricted physical resource 104' and the first credential reader 102'. Transmittal of such a request may be performed when it is desirable to store, centrally in the access control system 100, information relating to allowed visitor credentials. Such embodiments comprise an action 408. In action 408 and in response to the second credential reader 102" receiving the finalising access request credential 108', the first resource controller 101' transmits, to the access controller 118 comprised in the access control system 100, a first request to add each received visitor credential 112 to a first set of allowed credentials associated with the first access-restricted physical resource 104' and the first credential reader 102'.

In addition to each received visitor credential 112, the first request may also comprise a request to add information relating to the host 106 such as credentials authenticating the host, or other host identification.

In action 410 each received visitor credential 112 may be added to the first set of allowed credentials.

In embodiments comprising action 408, the access controller 118 adds each received visitor credential 112 to the first set of allowed credentials. If the first request comprised any host information, such information may also be added to the first set of allowed credentials. The first set of allowed credentials may be stored at the access controller 118, e.g., in a memory comprised in the access controller 118 or in a memory arranged in communication with the access controller 118. This may be seen as the visitor credentials to be allowed access to the first access-restricted physical resource 104' are added to a central storage by the access controller 118 since the access controller 118 is arranged centrally in the access control system 100. When the access controller 118 has added the visitor credentials to the first set of allowed credentials, the access controller 118 may confirm to the first resource controller 101' that each received credential has been successfully added. This may be performed by the access controller 118 transmitting a confirmation to the first resource controller 101' confirming that each received visitor credential 112 has been added. The first resource controller 101' may keep an instance or a copy of the first set of allowed credentials even if the addition is made by the access controller 118. Thereby, the first resource controller 101' is able to determine whether or not a received visitor credential is comprised in the first set of allowed credentials without being in communication with the access controller 118. Thus, even if there is a downtime in the communication between the first resource controller 101 and the access controller 118, the first resource controller 101' is able to grant or deny a certain visitor access to the access-restricted physical resource. Further, if one of the first resource controller 101' or the access controller 118 needs to be replaced, e.g., due to a malfunction, the other one of them has a copy of the first set of allowed credentials and could send an instance of the first set of allowed credentials to a new first resource controller or a new access controller.

Adding Visitor Credentials at the First Resource Controller 101'

Alternatively or additionally, in some embodiments, action 410 comprises that the first resource controller 101' adds, in response to the second credential reader 102" receiving the finalising access request credential 108', each received visitor credential 112 to the first set of allowed credentials associated with the first access-restricted physical resource 104' and the first credential reader 102'. In addition to the received visitor credentials, information relating to the host 106 may also be added to the first set of allowed credentials. The first set of allowed credentials may be stored at the first resource controller 101', e.g., in a memory comprised in the first resource controller 101' or in a memory arranged in communication with the first resource controller 101'. This may be seen as the visitor credentials 112 to be allowed access to the first access-restricted physical resource 104' are added to a local storage by the first resource controller 101' since the first resource controller 101' usually is arranged at or in close proximity to the first access-restricted physical resource 104'. This may also be referred to as they are located at the edge of the access control system 100.

In embodiments wherein the initiating access request credential 108 or the finalising access request credential 108' is received together with an indication of an amount of allowed access, the first resource controller 101' or the access controller 118 adds each received visitor credential 112 to a first set of allowed credentials together with the indicated total amount of the allowed access for each visitor. Thereby, the first set of allowed credentials may not only comprise information about the visitor credentials and possible host related information but may also comprise information relating to the amount of access allowed to each visitor.

The visitor should have the same access rights to one or more second access-restricted resources 104" controlled by the first resource controller 101' as to the first access-restricted physical resource 104' controlled by the first resource controller 101'.

In some embodiments it may be determined that the first credential reader 102' belongs to a group of credential readers, which group in addition to the first credential reader 102' comprises one or more second credential readers 102" associated with one or more second access-restricted physical resources 104" controlled by the first resource controller 101' and to which one or more second access-restricted physical resources 104" the visitor(s) should have the same right to access. This may be the case for both embodiments including action 408 and for embodiments not including action 408. Therefore, visitor information comprised in the first set of allowed credentials may be added to one or more second sets of allowed credentials associated with the second credential readers 102" comprised in the group of credential readers. In such embodiments action 410 may further comprise that the first resource controller 101' or the access controller 118 determines that the first credential reader 102' is comprised in a group of credential readers. The group of credential readers also comprises one or more second credential readers 102" being associated with one or more second access-restricted physical resources 104" to which the one or more visitors 110 is to be allowed access. The one or more second credential readers 102" comprised in the group of credential readers are arranged in communication with the first resource controller 101' controlling access to the one or more second access-restricted physical resources 104" to which the one or more visitors 110 is to be allowed access. The first resource controller 101' or the access controller 118, adds information, relating to the one or more visitors 110 and stored in the first set of allowed credentials, to one or more second sets of allowed credentials, wherein each second set of allowed credentials is associated with a respective second access-restricted physical resource 104" out of the one or more second access-restricted physical resources 104" and associated with a respective second credential reader 102" comprised in the group of credential readers.

In action 412 and according to some embodiments, the first credential reader 102' or the second credential reader 102" may activate, in response to a successful addition of the one or more visitor credentials 112, an indication indicating that each received visitor credential 112 has been added. This may indicate to a host 106 that the visitor credentials 112 of the visitors he/she wants to give access to have been successfully added to the set of allowed credentials. The indication may be a visual indication such as a light that is switched on or is flashing or a textual message that is displayed on a screen, an audible indication such as a beeping sound, or a combination of a visual indication and audible indication.

In action 414, the first resource controller 101' allows a visitor 110 to access the first access-restricted physical resource 104' upon presenting the visitor's 110 visitor credential 112 to the first credential reader 102'.

In some embodiments, the action 414 of allowing the visitor to access the first access-restricted physical resource 104' further comprises allowing the visitor 110 to access the first access-restricted resource 104' when the visitor's presented visitor credential 112 is comprised in the first set of allowed credentials.

As mentioned above, a second credential reader 102" may be arranged at the first access-restricted physical resource 104'. In such scenario, the first resource controller 101' may allow the visitor 110 to access the first access-restricted physical resource 104' upon presenting his/her visitor credential 112 to the second credential reader 102".

In some embodiments, wherein the visitor credentials 112 have been added to the first set of allowed credentials together with an indicated total amount of allowed access. Then, the first set of allowed credentials comprises a total amount of allowed access for each visitor. In such embodiments, the allowing of the visitor 110 to access the first access-restricted physical resource 104' further comprises allowing the visitor 110 to access the first access-restricted physical resource 104' only when an amount of access to be allowed is within the visitor's total amount of allowed access. Further, in such embodiments and when applicable, the visitor's total amount of allowed access may be updated with a remaining total amount of allowed access. It may be applicable to perform the update when for example a visitor is given allowance to enter into a room or building a certain number of times and thus the visitor's total amount of allowed access has to be updated with the remaining number of times after each time the visitor has entered into the room or building. As another example, if a visitor is given allowance to access a charging station a certain number of times or allowance to use the charging station to charge his/her car with a certain amount of electricity, the visitor's total amount of allowed access has to be updated accordingly after accessing the charging station. The updating of the total amount of allowed access may be performed by the first resource controller 101' or the access controller 118 depending on which one of the two is in control of the first set of allowed credentials. However, when the total amount of allowed access is given as a period of time, e.g., a time period between two dates, there is no need to update the total amount of allowed access after each access by the visitor since the period of time will not be changed. In such case it may not be applicable to perform an update of the total amount of allowed access.

The visitor should have the same access rights to one or more third access-restricted resources 104''' controlled by a second resource controller 101" as to the first access-restricted physical resource 104' controlled by the first resource controller 101'.

Under action 410 above, it was described how to add allowed credentials comprised in the first set of allowed credentials to one or more second sets of allowed credentials associated with one or more second access-restricted physical resources 104" when those one or more second access-restricted physical resource 104" are controlled by the first resource controller 101'. In actions 416-420 below it will be described how to add allowed credentials comprised in the first set of allowed credentials to one or more third sets of allowed credentials associated with one or more third access-restricted physical resources 104''' when those one or more third access-restricted physical resource 104''' are controlled by one or more second resource controllers 101" being different from the first resource controller 101'.

In action 416, a third credential reader 102''' associated with a third access-restricted physical resource 104''' receives the initiating access request credential 108 initiating a request to give one or more visitors 110 access to the third access-restricted physical resource 104''' in addition to the first access-restricted physical resource 104'. The third access-restricted physical resource 104''' is controlled by a second resource controller 101" arranged in communication with the third credential reader 102''' and being different from the first resource controller 101'.

In action 418, the second resource controller 101", transmits, to the access controller 118, a second request to add, to a third set of allowed credentials associated with the third access-restricted physical resource 104''', information relating to visitor accesses previously added using the initiating access request credential 108.

When the second request is received by the access controller 118 within a predefined time period from reception of the first request, the access controller 118, adds in action 420 information relating to the visitor accesses previously added to the second/third set of allowed credentials. The first request was transmitted as described in Action 408 above.

The information added may be information relating to the visitor credentials comprised in the first set of allowed credentials. Information relating to the total amount of access allowed to each visitor may also be added. Sometimes information relating to the host(-s) 106 who gave the access rights in the first set of allowed credentials is also added. Such host information may relate to credentials used to authenticate the host.

Changing a Visitor's Access Right

Figure 5:
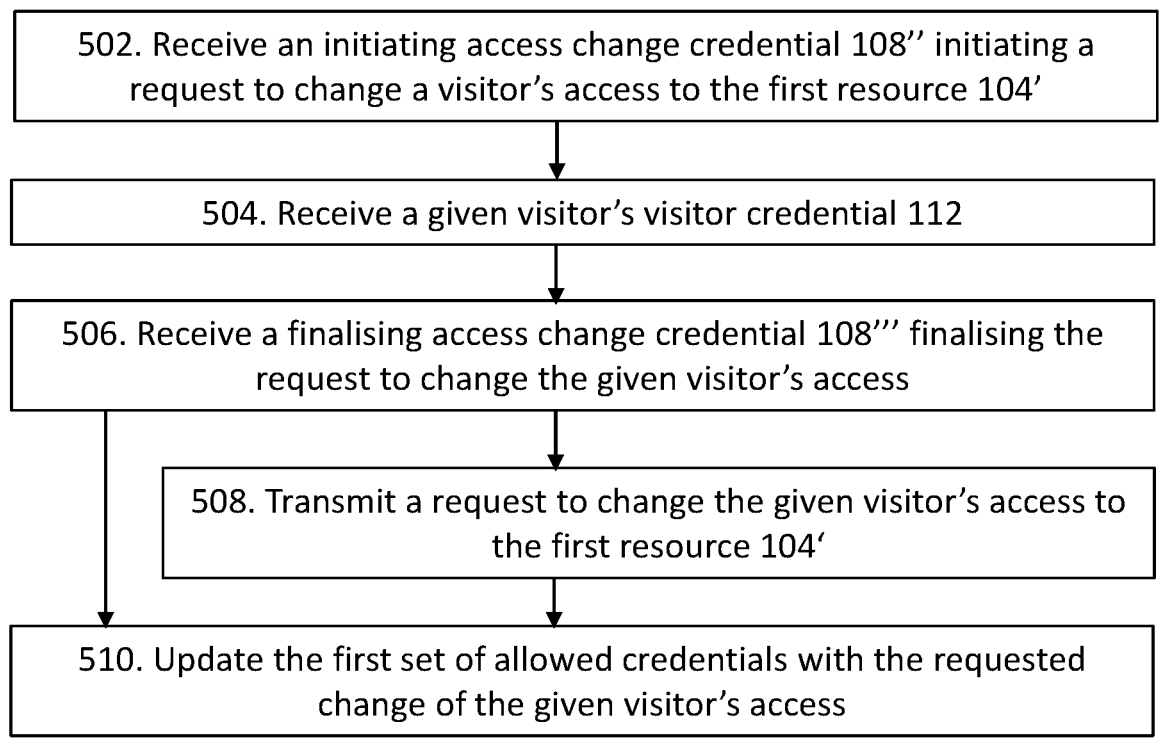
FIG. 5 is a flowchart of a method for changing a visitor's access right to an access-restricted physical resource according to embodiments.

The method, performed in the access control system 100, for handling access to the access-restricted physical resource, as described above in relation to FIGS. 4A and 4B may comprise one or more additional actions relating to how to change a visitor's access right. These actions will be described below with reference to FIG. 5. It should be understood that the method illustrated in FIG. 5 may be performed by different parts of the access control system 100.

For example, in some first embodiments, some of the actions may be performed by the first or second credential reader 102',102" arranged in communication with the first resource controller 101'. This may be the case when the credential reader 102 used to allow the visitor access is also used to change the visitor's given access right.

As another example, in some second embodiments, some of the actions may be performed by the second resource controller 101" or by the third credential reader 102''' not arranged in communication with the first resource controller 101' but arranged in communication with the second resource controller 101". The second resource controller 101" may be arranged in communication with the access controller 118, e.g., when the access control system 100 is a central system, or with the first resource controller 101', e.g., when the access control system 100 is a distributed system. Some second embodiments may be applicable when the credential reader used to allow the visitor access and the credential reader used to change the visitor's given access right are different credential readers.

Further, it should be understood that some of the actions may be optional and that actions may be taken in another suitable order.

In action 502, an initiating access change credential 108" initiating a request to change a visitor's access to the first access-restricted physical resource 104' is received. In some first embodiments, the first or second credential reader 102',102" receives the initiating access change credential 108". In some second embodiments, the third credential reader 102''' receives the initiating access change credential 108". The initiating access change credential 108" is received together with information relating to a change to be made. For example, the information may relate to a new time period for when access should be allowed or to a new total amount of access to be allowed. This may be the case when a previously given time period has expired and a new period of the is needed, or when a previously given total amount of allowed access has been consumed and a new total amount of allowed access is needed. Alternatively, the information may relate to a deletion of a given access right. The initiating access change credential 108" may be the same credential as the initiating access request credential 108. Thus, the host may use the same credential when initiating a request to give access and when initiating a request to change a given access. If the same credential is used, the access control system will interpret the credential as initiating access request credential when the following visitor credential is unknown to the access control system, and as an initiating access change credential when the following visitor credential is known to the access control system.

In action 504, a given visitor's visitor credential 112 is received. In some first embodiments, the first or second credential reader 102',102" receives the given visitor's visitor credential 112. In some second embodiments, the third credential reader 102''' receives the given visitor's visitor credential 112.

In action 506, a finalising access change credential 108''' finalising the request to change the given visitor's access is received. In some first embodiments, the first or second credential reader 102,102' receives the finalising access change credential 108'''. In some second embodiments, the third credential reader 102" receives the finalising access change credential 108'''. The finalising access change credential 108''' may be the same credential as the finalising access request credential 108'. Thus, the host may use the same credential when finalising the request to give access and when finalising the request to change a given access. As previously mentioned, the initiating access request credential 108 and the finalising access request credential 108 may be the same credential. Thus, the initiating access change credential 108" and the finalising access change credential 108''' may also be the same credential as the initiating access request credential 108 and the finalising access request credential 108.

The information relating to the change to be made may be given as a separate entry given to the credential reader after the initiating or finalising access change credential is received. For example, after presenting the initiating or finalising access change credential, the host may enter a character string. Alternatively, the indication of the total amount of allowed access may be comprised in the received initiating or finalising access change credential 108",108'''. Every time such a credential is received at the credential reader, the credential reader also receives the predefined change to be made. The initiating or finalising access change credential 108",108''' may be predefined or preconfigured to change access to a certain access-restricted physical resource by a certain amount up or down. For example, the initiating or finalising access change credential 108",108''' may be preconfigured to change, e.g., increase or decrease, an access right by a certain number of days or hours, or to change dates when access it to be allowed. As another example, the initiating or finalising access change credential 108",108''' may be preconfigured to remove access rights.

In action 508, a request to change the given visitor's access to the first access-restricted physical resource 104' is transmitted from the second resource controller 101" to the access controller 118 or to the first resource controller 101'. In for example, a centralised system, the access controller 118 may store the first set of allowed credentials and thus the access controller 118 needs to be informed about the requested change, while the first resource controller 101' needs to be informed in case the access control system 100 is a distributed system.

In action 510, the first set of allowed credentials is updated with the requested change of the given visitor's access to the first access-restricted physical resource 104. In some first embodiments, the first resource controller 101' or the access controller 118 updates the first set of allowed credentials. In some second embodiments, the access controller 118 updates the first set of allowed credentials. The access controller 118 may either directly update the first set of allowed credentials or indirectly by sending the update to the first resource controller 101' that updates the first set of allowed credentials.

Embodiments also relates to an access control system 100 for handling access to an access-restricted physical resource. The access control system 100 comprises a first credential reader 102' associated with a first access-restricted physical resource 104' and being arranged in communication with a first resource controller 101' controlling access to the first access-restricted physical resource 104'. The first credential reader 102' is configured to:

receive an initiating access request credential 108 initiating a request to give one or more visitors access to the first access-restricted physical resource 104', and configured to:

receive a visitor credential 112 for each visitor for which access is requested.

Further, the access control system 100 comprises a second credential reader 102" arranged in communication with the first resource controller 101' and configured to receive a finalising access request credential 108' finalising the request to give the one or more visitors 110 access to the first access-restricted physical resource 104'.

Furthermore, the first resource controller 101' is configured to allow a visitor 110 to access the first access-restricted physical resource 104' upon presenting the visitor's visitor credential 112 to the first credential reader 102'.

Embodiments also relate to a non-transitory computer-readable medium having stored thereon computer code instructions adapted to carry out the method of any one of actions described in this disclosure when executed by a device having processing capability.

As described above, the access control system 100, e.g., the one or more components of the access control system 100, may be configured to implement a method for handling access to an access-restricted physical resource 104. For this purpose, the access control system 100 may include circuitry which is configured to implement the various actions described in this disclosure.

In a hardware implementation, the circuitry may be dedicated and specifically designed to implement one or more of the actions. The circuitry may be in the form of one or more integrated circuits, such as one or more application specific integrated circuits or one or more field-programmable gate arrays. By way of example, the access control system 100 may hence comprise circuitry which, when in use, receives an initiating access request credential 108 initiating a request to give one or more visitors access to the first access-restricted physical resource 104'. The access control system 100 may further comprise circuitry which, when in use, receives a visitor credential 112 for each visitor for which access is requested. Furthermore, the access control system 100 may comprise circuitry which, when in use, receives a finalising access request credential 108' finalising the request to give the one or more visitors 110 access to the first access-restricted physical resource 104'. The access control system 100 may further comprise circuitry which, when in use, allow a visitor 110 to access the first access-restricted physical resource 104' upon presenting the visitor's visitor credential 112 to the first credential reader 102'.

In a software implementation, the circuitry may instead be in the form of one or more processors, such as one or more microprocessors, which in association with computer code instructions stored on a (non-transitory) computer-readable medium, such as a non-volatile memory, causes the access control system 100 to carry out one or more of the actions disclosed herein. Examples of non-volatile memory include read-only memory, flash memory, ferroelectric RAM, magnetic computer storage devices, optical discs, and the like. In a software case, each of the actions described above may thus correspond to a portion of computer code instructions stored on the computer-readable medium, that, when executed by the one or more processors, causes the access control system 100 to carry out any method disclosed herein.

It is to be understood that it is also possible to have a combination of a hardware and a software implementation, meaning that some actions are implemented in hardware and others in software.

It will be appreciated that a person skilled in the art can modify the above-described embodiments in many ways and still use the advantages of the disclosure as shown in the embodiments above. Thus, the disclosure should not be limited to the shown embodiments but should only be defined by the appended claims. Additionally, as the skilled person understands, the shown embodiments may be combined.

The invention claimed is:

1. A method, performed in an access control system, for handling access to an access-restricted physical resource, the method comprising:

by a first credential reader associated with a first access-restricted physical resource, receiving, as input to the access control system, a host's initiating access request credential initiating a request to give one or more visitors access right to the first access-restricted physical resource, wherein the first credential reader is arranged in communication with a first resource controller controlling access to the first access-restricted physical resource;

by the first credential reader, receiving, as input to the access control system, a visitor credential for each visitor for which a same access right is requested;

by a second credential reader associated with an access-restricted physical resource and arranged in communication with the first resource controller, receiving, as input to the access control system, a host's finalising access request credential finalising the request to give the one or more visitors access right to the first access-restricted physical resource; and by the first resource controller, receiving information about the finalisation of the request to give access and the one or more visitor credentials, and allowing a visitor to access the first access-restricted physical resource upon presenting the visitor's visitor credential to the first credential reader.

2. The method of claim 1, wherein the first credential reader and the second credential reader are one out of:

one and the same credential reader; and two different credential readers.

3. The method of claim 1, wherein the initiating access request credential and the finalising access request credential are one out of:

a single access credential being associated with a first host or a second host; and two different access credentials, each of which being associated with only one out of the first host and the second host; and wherein the first host and the second host are authorised to give the one or more visitors access to the first access-restricted physical resource.

4. The method of claim 1, further comprising:

in response to the second credential reader receiving the finalising access request credential and by the first resource controller, adding each received visitor credential to a first set of allowed credentials associated with the first access-restricted physical resource and the first credential reader.

5. The method of claim 4, further comprising:

in response to a successful addition of the one or more visitor credentials and by the first credential reader or the second credential reader, activating an indication indicating that each received visitor credential has been added.

6. The method of claim 4, wherein the allowing of the visitor to access the first access-restricted physical resource further comprises:
allowing the visitor to access the first access-restricted resource when the visitor's presented visitor credential is comprised in the first set of allowed credentials.

7. The method of claim 6, wherein the initiating access request credential or the finalising access request credential is received with an indication of a total amount of allowed access to the first access-restricted physical resource that the one or more visitors is to be given and wherein the adding of each received visitor credential to the first set of allowed credentials, further comprises:
adding the indicated total amount of the allowed access for each visitor, and wherein the allowing of the visitor to access the first access-restricted physical resource further comprises:
allowing the visitor to access the first access-restricted physical resource only when an amount of access to be allowed is within the visitor's total amount of allowed access; and wherein the method further comprises:
when applicable, updating the visitor's total amount of allowed access with a remaining total amount of allowed access.

8. The method of claim 4, further comprising:
by the first credential reader or the second credential reader, receiving an initiating access change credential initiating a request to change a visitor's access to the first access-restricted physical resource;
by the first credential reader or the second credential reader, receiving a given visitor's visitor credential;
by the first credential reader or the second credential reader, receiving a finalising access change credential finalising the request to change the given visitor's access; and
updating the first set of allowed credentials with the requested change of the given visitor's access.

9. The method of claim 4, wherein the adding of each received visitor credential to a first set of allowed credentials further comprises:
by the first resource controller or the access controller, determining that the first credential reader is comprised in a group of credential readers, which group also comprises one or more second credential readers being arranged in communication with the first resource controller and being associated with one or more second access-restricted physical resources to which the one or more visitors is to be allowed access;
by the first resource controller or the access controller, adding information relating to the one or more visitors and stored in the first set of allowed credentials to one or more second sets of allowed credentials, wherein each second set of allowed credentials is associated with a respective second access-restricted physical resource out of the one or more second access-restricted physical resources and associated with a respective second credential reader comprised in the group of credential readers.

10. The method of claim 1, further comprising:
in response to the second credential reader receiving the finalising access request credential and by the first resource controller, transmitting, to an access controller comprised in the access control system, a first request to add each received visitor credential to a first set of allowed credentials associated with the first access-restricted physical resource and the first credential reader; and
by access controller, adding each received visitor credential to the first set of allowed credentials.

11. The method of claim 10, further comprising:
in response to a successful addition of the one or more visitor credentials and by the first credential reader or the second credential reader, activating an indication indicating that each received visitor credential has been added.

12. The method of claim 10, wherein the allowing of the visitor to access the first access-restricted physical resource further comprises:
allowing the visitor to access the first access-restricted resource when the visitor's presented visitor credential is comprised in the first set of allowed credentials.

13. The method of claim 10, further comprising:
by the first credential reader or the second credential reader, receiving an initiating access change credential initiating a request to change a visitor's access to the first access-restricted physical resource;
by the first credential reader or the second credential reader, receiving a given visitor's visitor credential;
by the first credential reader or the second credential reader, receiving a finalising access change credential finalising the request to change the given visitor's access; and
updating the first set of allowed credentials with the requested change of the given visitor's access.

14. The method of claim 10, wherein the adding of each received visitor credential to a first set of allowed credentials further comprises:
by the first resource controller or the access controller, determining that the first credential reader is comprised in a group of credential readers, which group also comprises one or more second credential readers being arranged in communication with the first resource controller and being associated with one or more second access-restricted physical resources to which the one or more visitors is to be allowed access;
by the first resource controller or the access controller, adding information relating to the one or more visitors and stored in the first set of allowed credentials to one or more second sets of allowed credentials, wherein each second set of allowed credentials is associated with a respective second access-restricted physical resource out of the one or more second access-restricted physical resources and associated with a respective second credential reader comprised in the group of credential readers.

15. The method of claim 10, further comprising:
by a third credential reader associated with a third access-restricted physical resource, receiving the initiating access request credential initiating a request to give one or more visitors access to the third access-restricted physical resource in addition to the first access-restricted physical resource, wherein the third access-restricted physical resource is controlled by a second resource controller arranged in communication with the third credential reader and being different from the first resource controller;
by the second resource controller, transmitting, to the access controller, a second request to add, to a third set of allowed credentials associated with the third access-restricted physical resource, information relating to visitor accesses previously added using the initiating access request credential; and when the second request is received by the access controller within a predefined time period from reception of the first request and by the access controller, adding, to the third set of allowed credentials, information relating to the visitor accesses previously added.

16. The method of claim 15, further comprising:

by the third credential reader, receiving an initiating access change credential initiating a request to change a visitor's access to the first access-restricted physical resource;

by the third credential reader, receiving a given visitor's visitor credential;

by the third credential reader, receiving a finalising access change credential finalising the request to change the given visitor's access to the first access-restricted physical resource;

by the second resource controller, transmitting, to the access controller or to the first resource controller, a request to change the given visitor's access to the first access-restricted physical resource; and by the access controller or the first resource controller, updating the first set of allowed credentials with the requested change of the given visitor's access to the first access-restricted physical resource.

17. The method of claim 1, further comprising:

by the first credential reader or the second credential reader, receiving at least one first host credential associated with the first host or at least one second host credential associated with the second host; and by the first resource controller or the access controller:

authenticating the first host based on the at least one first host credential in combination with at least one of the initiating access request credential and the finalising access request credential, or authenticating the second host based on the at least one second host credential in combination with at least one of the initiating access request credential and the finalising access request credential.

18. An access control system for handling access to an access-restricted physical resource, comprising:

a first credential reader associated with a first access-restricted physical resource, being arranged in communication with a first resource controller controlling access to the first access-restricted physical resource and configured to:

receive, as input to the access control system, a host's initiating access request credential initiating a request to give one or more visitors access right to the first access-restricted physical resource, and to:

receive, as input to the access control system, a visitor credential for each visitor for which access right is requested; and configured to:

and comprising:

a second credential reader arranged in communication with the first resource controller, and configured to receive, as input to the access control system, a host's finalising access request credential finalising the request to give the one or more visitors access right to the first access-restricted physical resource; and wherein the first resource controller is configured to receive information about the finalisation of the request to give access and the one or more visitor credentials, and to allow a visitor to access the first access-restricted physical resource upon presenting the visitor's visitor credential to the first credential reader.

19. A non-transitory computer-readable medium having stored thereon computer code instructions adapted to carry out a method for handling access to an access-restricted physical resource, when executed by a device having processing capability the method, performed in an access control system, comprising:

by a first credential reader associated with a first access-restricted physical resource, receiving, as input to the access control system, a host's initiating access request credential initiating a request to give one or more visitors access right to the first access-restricted physical resource, wherein the first credential reader is arranged in communication with a first resource controller controlling access to the first access-restricted physical resource;

by the first credential reader, receiving, as input to the access control system, a visitor credential for each visitor for which a same access right is requested;

by a second credential reader associated with an access-restricted physical resource and arranged in communication with the first resource controller, receiving, as input to the access control system, a host's finalising access request credential finalising the request to give the one or more visitors access right to the first access-restricted physical resource; and by the first resource controller, receiving information about the finalisation of the request to give access and the one or more visitor credentials, and allowing a visitor to access the first access-restricted physical resource upon presenting the visitor's visitor credential to the first credential reader.

* * * * *